US012608997B2

(12) United States Patent
Mugnolo

(10) Patent No.: US 12,608,997 B2
(45) Date of Patent: Apr. 21, 2026

(54) CASINO SECURITY SYSTEM AND METHOD FOR MONITORING WAGERING GAMES

(71) Applicant: FM Gaming LLC, Bellwood, IL (US)

(72) Inventor: Frank Mugnolo, Oak Brook, IL (US)

(73) Assignee: FM Gaming LLC, Bellwood, IL (US)

( * ) Notice: Subject to any disclaimer, the term of this patent is extended or adjusted under 35 U.S.C. 154(b) by 155 days.

(21) Appl. No.: 17/754,663

(22) PCT Filed: Oct. 6, 2020

(86) PCT No.: PCT/US2020/054333
§ 371 (c)(1),
(2) Date: Apr. 8, 2022

(87) PCT Pub. No.: WO2021/071795
PCT Pub. Date: Apr. 15, 2021

(65) Prior Publication Data

US 2024/0078870 A1 Mar. 7, 2024

Related U.S. Application Data

(60) Provisional application No. 62/913,433, filed on Oct. 10, 2019.

(51) Int. Cl.
*G07F 17/32* (2006.01)

(52) U.S. Cl.
CPC ...... *G07F 17/3241* (2013.01); *G07F 17/3232* (2013.01)

(58) Field of Classification Search
CPC ............ G07F 17/3232; G07F 17/3234; G07F 17/3237; G07F 17/3239; G07F 17/3241; G07F 17/3244
See application file for complete search history.

(56) References Cited

U.S. PATENT DOCUMENTS 6,154,131 A * 11/2000 Jones, II ............ G07F 17/3206 340/556
2002/0074726 A1* 6/2002 Yoseloff ............. G07F 17/3244 273/274
2006/0199649 A1 9/2006 Soltys et al.
2006/0281537 A1 12/2006 Abbott et al.
2008/0076529 A1 3/2008 Richards et al.
2008/0113783 A1* 5/2008 Czyzewski ............ G07F 17/32 463/43
2010/0121808 A1* 5/2010 Kuhn .................... G06N 20/00 463/43
2014/0113712 A1* 4/2014 Van Asdale ......... G07F 17/3255 463/27
(Continued)

*Primary Examiner* — Jasson H Yoo
(74) *Attorney, Agent, or Firm* — Fox Rothschild LLP

(57) ABSTRACT

The disclosure relates to a casino security system for monitoring wagering games. The method may include determining that a wager is positioned on a power play area of the wagering game; analyzing one or more images of the wager captured by a camera(s) to determine an initial value of the wager; determining a phase of the wagering game, and based on the determined phase of the wagering game, analyzing the one or more images of the wager to determine a value of the wager at the phase of the wagering game; and determining whether a player cheated at the phase of the wagering game by comparing the initial value of the wager to the value of the wager determined at the phase.

4 Claims, 7 Drawing Sheets

(56) References Cited

U.S. PATENT DOCUMENTS

2016/0055716 A1* 2/2016 Young-Czyzewski ........................ G07F 17/3211 463/17
2017/0312618 A1 11/2017 Milosevich et al.
2018/0075690 A1* 3/2018 Moore .................... A63F 1/067
2018/0350191 A1 12/2018 Shigeta
2019/0005767 A1* 1/2019 Shigeta ............... G07F 17/3251

* cited by examiner

CASINO SECURITY SYSTEM AND METHOD FOR MONITORING WAGERING GAMES

CROSS-REFERENCE TO RELATED APPLICATIONS

This application claims priority under 35 U.S.C. § 119(e) to U.S. Provisional Patent Application No. 62/913,433, filed Oct. 10, 2019. The foregoing application is incorporated by reference herein in its entirety.

BACKGROUND

A casino may offer various games, such as roulette and craps, in which the rules result in the casino receiving slightly favorable odds over the players. As such, the casino will reap larger rewards as the volume of bets increase. However, cheating by players is one of the main factors that casinos face in reaping these rewards. For instance, one common form of cheating is past posting, in which a player places his or her chips on a winning area of the gaming table after the result of the game is known. Dealers are trained to detect cheating, and personnel viewing security videos of the game provide an additional layer of observation to detect cheating. However, it may be difficult to track wagers at different stages of a game, in particular, when there are many areas of a gaming table to observe, and more so, when there are many players at one gaming table.

SUMMARY

The present disclosure relates generally to casino gaming, and more particularly, to a casino security system for monitoring wagering games.

In one or more cases, the disclosed technology relates to a method for monitoring a wagering game. In one or more cases, the method includes determining that a wager is positioned on a power play area of the wagering game. In one or more cases, the method includes capturing, via a camera positioned on the wagering game, one or more images of the wager on the power play area. In one or more cases, the method includes analyzing image data of the one or more images of the wager to determine an initial value of the wager. In one or more cases, the method includes determining a phase of the wagering game. In one or more cases, the method includes capturing, via the camera, in response to determining the phase of the wagering game, one or more images of the wager at the phase of the wagering game. In one or more cases, the method includes analyzing image data of the one or more images of the wager at the phase of the wagering game to determine a value of the wager at the phase of the wagering game. In one or more cases, the method includes determining whether a player cheated at the phase of the wagering game by comparing the initial value of the wager to the value of the wager determined at the phase A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed in the present disclosure are based.

BRIEF DESCRIPTION OF THE FIGURES

The following drawings are illustrative of particular embodiments of the present disclosure and therefore do not limit the scope of the present disclosure. The drawings are not to scale and are intended for use in conjunction with the explanations in the following detailed description.

DETAILED DESCRIPTION

Figure 1:
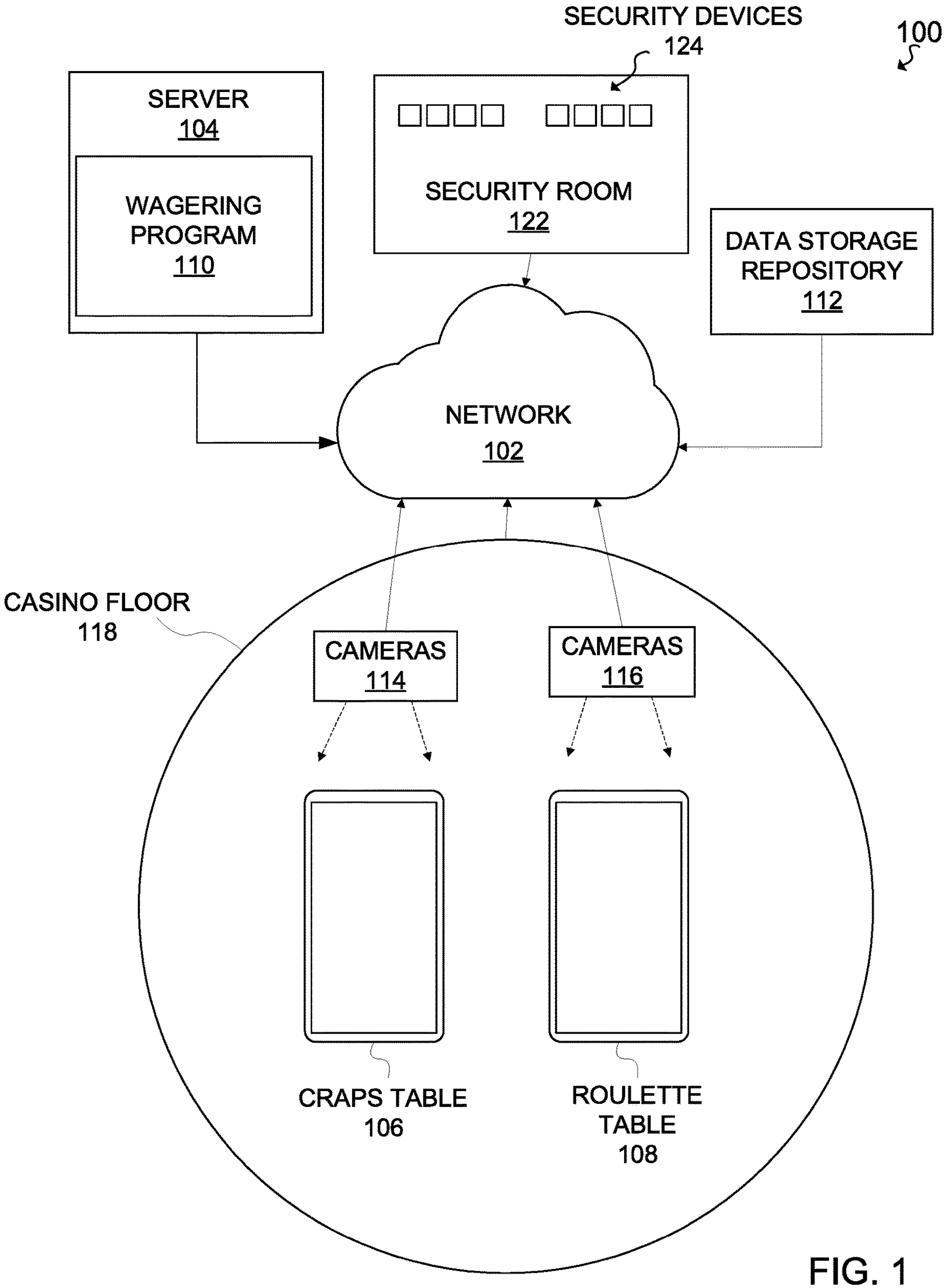
FIG. 1 is a functional block diagram illustrating a casino.

In the following detailed description, numerous details are set forth in order to provide an understanding of a wagering program; however, it will be understood by those skilled in the art that different and numerous embodiments of the wagering program and the method of operation may be practiced without those specific details, and the claims and disclosure should not be limited to the embodiments, subassemblies, features, processes, methods, aspects, features or details specifically described and shown in the present disclosure. Further, particular features described in the present disclosure can be used in combination with other described features in each of the various possible combinations and permutations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

The following detailed description omits or only briefly describes conventional features of a casino, which are apparent to those skilled in the art. Moreover, unless otherwise specifically defined in the present disclosure, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms “a,” “an” and “the” include plural referents unless otherwise specified, and that the terms “comprises” and/or “comprising,” when used in this specification, specify the presence of stated features, steps, operations, elements, and/or components, but do not preclude the presence or addition of one or more other features, steps, operations, elements, components, and/or groups.

Embodiments disclosed in the present disclosure relate generally to casino gaming, and more particularly, to a casino security system for monitoring wagering games. The embodiments are described below with reference to the Figures.

FIG. 1 is a functional block diagram illustrating an environment, such as a casino 100. FIG. 1 provides only an illustration of one implementation and does not imply any limitations with regard to the environments in which different embodiments may be implemented. Many modifications to the depicted environment may be made by those skilled in the art without departing from the scope of the embodiments of the present disclosure. The casino 100 includes a network 102, a server 104, which operates a wagering program 110 (hereinafter "program 110"), a security room 122, a data storage repository 112, and a casino floor 118. The casino floor 118 may include slot machines, one or more gaming tables, such as a craps table 106 and a roulette table 108, and one or more security cameras, such as cameras 114 and cameras 116. In one or more cases, the security cameras may be positioned to capture images of a designated area of the casino floor 118. For example, one or more cameras 114 may be positioned to capture images of the craps table 106, and one or more cameras 116 may be positioned to capture images of the roulette table 108. The security room 122 may include one or more computing electronic devices, such as security devices 124, to view the captured images of the security cameras.

The network 102 can be, for example, a local area network (LAN), a telecommunications network, a wide area network (WAN), such as the Internet, a virtual local area network (VLAN), a Bluetooth® network, or any combination that can include wired, wireless, or fiber optic connections. The network 102 can also include wire cables, wireless communication links, fiber optic cables, routers, switches and/or firewalls. The network 102 interconnects the server 104, one or more security devices 124, the data storage repository 112, one or more cameras 114 and 116, and one or more gaming tables, such as the craps table 106 and the roulette table 108. In general, the network 102 can be any combination of connections and protocols capable of supporting communications between the server 104, the security devices 124, the cameras 114 and 116, the tables 106 and 108, and the program 110.

The server 104 is a web-based server hosting the program 110. In one or more cases, the server 104 can be a web server, a blade server, a computer including one or more processors and at least one non-transitory computer readable memory, a mobile computing device, a laptop computer, a tablet computer, a netbook computer, a personal computer (PC), a desktop computer, or any programmable electronic device or computing system capable of receiving and sending data, via the network 102, and performing computer-readable program instructions. In one or more cases, the server 104 can be a data center, consisting of a collection of networks and servers providing an IT service, such as virtual servers and applications deployed on virtual servers, to an external party. In one or more cases, the server 104 represents a computing system utilizing clustered computers and components (e.g., database server computer, application server computers, etc.) that act as a single pool of seamless resources, such as in a cloud computing environment, when accessed by one or more components within the casino 100. In one or more cases, the server 104 may be physically located in the security room 122, within another secure room of the casino 100, or offsite from the casino 100.

In one or more cases, the server 104 includes a data storage repository 112 for storing data including, but not limited to, one or more phases of a craps game, and one or more phases of a roulette game. The data storage repository 112 can be one of, a web server, a mobile computing device, a laptop computer, a tablet computer, a netbook computer, a personal computer (PC), a desktop computer, or any programmable electronic device or computing system capable of receiving, storing, and sending data, such as data and performing computer readable program instructions capable of communicating with the server 104, the one or more security devices 124, the data storage repository 112, the cameras 114 and 116, and the one or more gaming tables, such as the craps table 106 and the roulette table 108, via the network 102. In one or more cases, the data storage repository 112 can represent virtual instances operating on a computing system utilizing clustered computers and components (e.g., database server computer, application server computers, etc.) that act as a single pool of seamless resources when accessed by one or more components within the casino environment 100. In one or more cases, the data storage repository 112 may be physically located in the security room 122, within another secure room of the casino 100, or offsite from the casino 100.

In one or more cases, the program 110 operates on a central server, such as the server 104, and may be utilized by the one or more security devices 124, via an application downloaded from the central server or a third-party application store, and executed on the one or more security devices 124. In one or more cases, the program 110 may be a software-based program, downloaded from a central server, such as the server 104, and installed on the one or more security devices 124. In one or more cases, the program 110 can be utilized as a software service provided by a third-party cloud service provider (not shown). In one or more cases, the program 110 may be preinstalled, as software and/or firmware, on the one or more security devices 124. In one or more cases, the program 110 may be installed onto the one or more security devices 124 via an external storage device, such as a universal serial bus (USB) flash drive.

The security room 122 may include one or more security devices 124. In one or more cases, the security device 124 is an electronic computing device, such as a desktop computer, a laptop computer, a tablet computer, a personal digital assistant (PDA), a smart phone, a thin client, or any other electronic device or computing system capable of communicating with the server 104 through the network 102. The security device 124 may be a client to the server 104. The security device 124 may be configured with a display suitable for displaying image data from the one or more cameras, such as cameras 114 and cameras 116, on the casino floor 118. The security device 124 may be configured to receive and display a cheating notification from the program 110, for the cases in which the program 110 determines that a player cheated as discussed herein. In one or more other cases, the security device 124 can be any suitable type of mobile device capable of running mobile applications, including smart phones, tablets, slate, or any type of device that runs a mobile operating system. For example, the security device 124 may be a mobile device operated by a user, such as casino security officer. The security device 124 may be capable of connecting to a network, such as the network 102, to view, on the display of the mobile device, image data from the one or more cameras, such as cameras 114 and cameras 116, on the casino floor 118 and/or to receive and display a cheating notification from the program 110, for the cases in which the program 110 determines that a player cheated as discussed herein. For example, the casino security officer may view the image data of cameras 114 and/or cameras 116 on the display of the security device 124 while on the casino floor 118.

In one or more cases, the security device 124 can include a user interface for providing an end user with the capability to interact with the program 110. A user interface refers to the information (such as graphics, text, sound, and/or image data) the program 110 presents to a user and the control sequences that the user employs to control the program 110. A user interface can be, for example, a keyboard that allows a user to input text, a mouse or touch screen that allows a user to select an icon, or the like. A user may access the program 110 through the user interface to enable the program 110 to operate on the user's device.

Figure 2A:
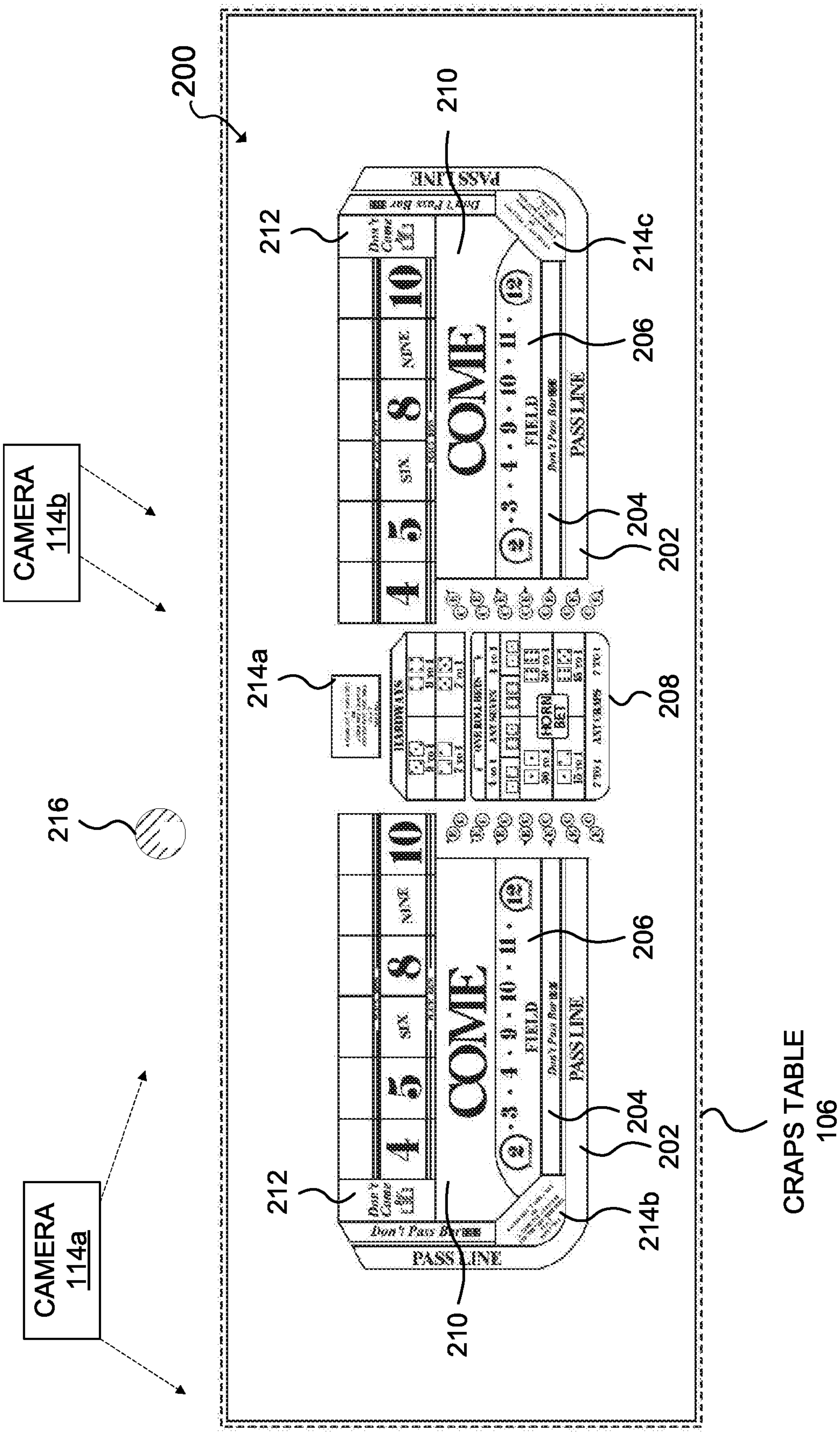
FIG. 2A is an example gaming table within the casino.
Figure 2B:
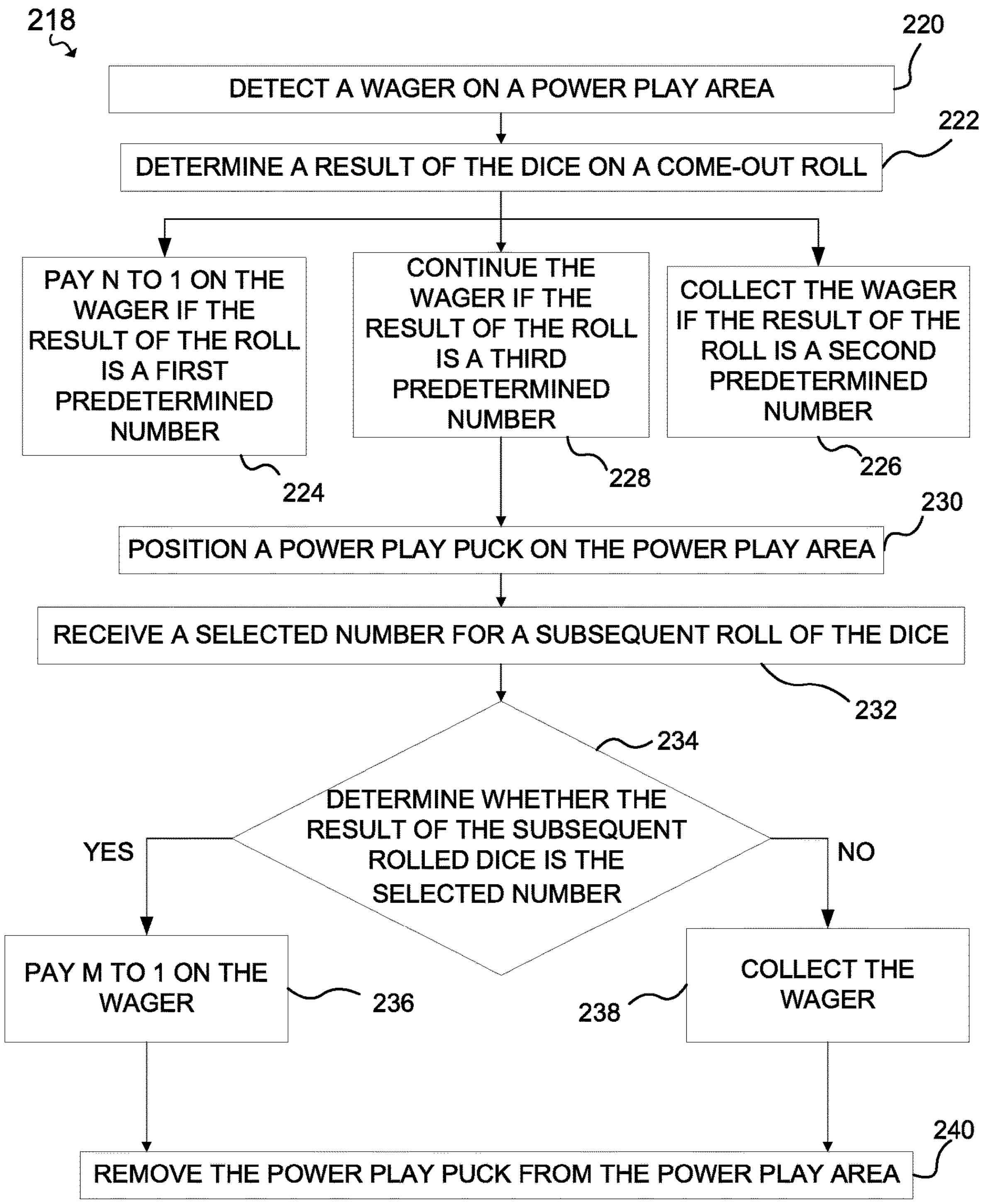
FIG. 2B is a flowchart that illustrates a method of operating the gaming table of FIG. 2A.

FIG. 2A is an example gaming table, such as a craps table 106, within the casino 100. FIG. 2B is a flowchart that illustrates a method, generally designated 218, of operating the gaming table 106 of FIG. 2A.

The craps table 106 may be an elongated game table having a horizontal surface surrounded by a sidewall to form a game play area 200 for playing craps, and more particularly, for playing a game of craps that involves power play wagering. The game play area 200 includes marked areas that correspond to various types of wagers. One or more players may place one or more chips, markers, and/or cash (hereinafter chips, markers, and/or cash are referred to as "chips") on the marked areas to indicate the player's wager on an outcome of a roll of a pair of dice. The marked areas may be formed in a variety of shapes, for example, a square or rectangular shape, and may include text within the perimeter of the marked area to indicate the type of wager. The marked areas may be printed on the horizontal surface of the craps table 106. The marked areas may be, for example, the pass line 202, don't pass bar 204, field 206, any craps area 208, come 210, and don't come 212. The game play area 200 may include one or more other marked areas, such as power play areas 214*a*, 214*b*, and 214*c*. In one or more cases, the one or more power play areas may be areas on the game play area 200 for placing a power play wager, as discussed herein. In one or more cases, a dealer at the craps table 106 may place one or more pucks, such as puck 216, on a power play area to indicate the craps power play wagering game is active. The puck 216, for example, may be a cylindrical disk.

The player throwing or rolling the pair of dice is known as the "shooter." The pair of each die is a cube-shaped game piece, having six faces. Each of the six faces of an individual die has a different arrangement of circular patches or pits, also known as pips, dots or spots, totaling one through six in number respectively. On an individual die, spots on opposite sides add up to seven.

Before the shooter throws the dice, the shooter and other players may place wagers on whether the shooter will roll a selected number of dots or a certain combination of dots, which is determined by examining and adding the number of dots showing on the upper faces of each die after being rolled onto the craps table 106 and coming to rest on the craps table 106. To place wagers, the shooter and/or other players may place their chips on the one or more marked areas of the game play area 200.

In a traditional game of craps, the shooter performs the first roll of the dice during the come-out phase, which may be known as the come-out roll or initial come-out. The shooter wins at the come-out roll by rolling a 7 or an 11. If the shooter rolls a 2, 3, or 12 at the come-out roll, which is known as a "craps," the shooter loses. If the shooter rolls any other number (i.e., 4, 5, 6, 8, 9, or 10) at the come-out roll, the shooter rolled a "point."

By rolling a point during the come-out roll, the shooter enters the point phase of the craps game. At the point phase, the shooter may win by rolling a point before rolling a 7. Winning at this stage of the game may be known as passing. If a 7 is rolled before the point number, the shooter has "sevened-out" or has rolled an "out 7" and loses. If the shooter rolls neither the point nor a 7, the round continues and the shooter continues to rolls the dice.

Players are permitted to place wagers on the outcome of the shooter's dice rolls by placing chips on the one or more marked areas of the game play area 200. A player may make simple wagers that includes the selection of one betting option, or combinations of betting options in the hopes of increasing the odds of winning, increasing the possible amount of winnings or hedging a wager. A player may place a "pass" or "pass line" and/or "don't pass" wager by placing one or more chips on the pass line 202 or don't pass bar 204, respectively. These wagers must be committed to and placed before the come-out roll. The player with a pass line wager wins on the come out roll if the roll totals 7 or 11. The pass line wager may be a wager that a point will be rolled before an out 7 on any roll subsequent to the come-out roll. If a player places a don't pass wager, the player is wagering that the shooter will roll a 2, 3 or 12 on the come-out roll, or an out 7 before making the point. The don't pass wager may be a wager against the shooter (i.e., a "wrong" bet).

After a shooter rolls a point, players may place a "come" wager on the come wager area 210 and/or a "don't come" wager area 212. The come wager may be a wager that the shooter will roll a 7 or 11 on the next roll, or make a point. After the shooter has established a point, a come wager may be made on every roll of the dice. If a player places a wager on the don't come wager area 212, the player is wagering that the shooter will roll a 2, 3 or 12 on the next roll, or will not make the point before rolling a 7.

Another wager may be an "odds" wager that can be made on an established pass, don't pass, come or don't come wager. For example, if a player places a "place to win" wager, the player wagers that the shooter will roll the number that a "win" wager is placed on, i.e., 4, 5, 6, 8, 9 or 10, before a 7 is rolled. In another example, if a player places a "place to lose" wager, the player wagers that the shooter will roll a 7 before the number that a "lose" wager is placed on, i.e., when a 4, 5, 6, 8, 9 or 10, is rolled.

Proposition wagers are wagers that the next roll will be a specific number. These include the 2, 3, 7, 11, and 12 bets, the "any craps" wager placed on the any craps area 208, the "field" wager placed on the field area 206, the "hop" wager, and/or the "horn" wager. The "field" wager, for example, is a single roll wager that the shooter will roll a 2, 3, 4, 9, 10, 11 or 12, on the next roll. Other wagers may include the "place number" wagers and the "proposition" wagers. A place number wager may be a wager that a particular number will roll before a 7 does, or vice versa. These include the "place," "buy," "lay" and "lose" wagers, the "big 6" and "big 8," and finally the "hard 4," "hard 6," "hard 8" and "hard 10." A "hard ways" wager is a wager that the shooter will roll either a 2, 3, 4, or 5 as a double, before it is thrown in any other combination, or before a 7 is rolled. An "any seven" is a wager that the shooter will roll a 7 on the next roll. An "any craps" is a wager that the shooter will roll a 2, 3 or 12 on the next roll. A "craps two" is a wager that the shooter will roll a 2 on the next roll. A "craps twelve" is a wager that the shooter will roll a 12 on the next roll. A "craps three" is a wager that the shooter will roll a 3 on the next roll. An "eleven" is a wager that the shooter will roll an 11 on the next roll. A "big 6" is a wager that a 6 will be rolled before a 7. A "big 8" is a wager that an 8 will be rolled before a 7.

It is understood that the wagers and game play described above is illustrative to encompass a traditional game of playing craps, and other wagers and game play from other versions of craps may be incorporated the craps game. Moreover, it will be understood that the embodiments of the invention detailed herein are contemplated as being incorporated into any and all versions of craps played and any current and future methods of playing craps.

In one or more cases, a wager is detected on a power play area (220). For example, the dealer at the craps table 106 may detect that a player placed a wager on a power play area, such as power play area 214*a*, 214*b*, or 214*c*. By placing the wager on the power play area, the player initiated a power play wager. The power play wager may be placed before the come-out roll. It should be noted that one or more players may place other traditional craps wagers in addition to one or more power play wagers before the come-out roll.

Having placed the power play wager on the game play area 200, the shooter throws the pair of dice on the come-out roll. The dealer determines a result of the dice on the come-out roll (222). In one or more cases, the dealer pays N to 1 on the wager if the result of the roll is a first predetermined number (224). For example, the dealer pays the player 2 to 1 on the power play wager if the result of the roll is a 7, i.e., the first predetermined number. It should be noted that the odds payout of 2 to 1 is merely exemplary and other odds payouts may be used, e.g., paying 3 to 1 on rolling the first predetermined number. Moreover, the first predetermined number of 7 is merely exemplary and another number may be used as a winning number. In one or more cases, the dealer collects the wager if the result of the roll is a second predetermined number (226). For example, if the result of the roll is a 2, 3, 11, or 12, the player loses the power play wager, and the dealer collects the wager. In one or more cases, a player continues the power play wager if the result of the roll is a third predetermined number (228). For example, if the total of the rolled dice is a 4, 5, 6, 8, 9, or 10, that is, the shooter rolled a point, the player continues the power play wager.

Having rolled the third number, the dealer may position a power play puck 216 on the power play area (230). The dealer may position the power play puck 216 on the power play area that received the power play wager. For example, if the player placed a wager on power play area 214*a*, the dealer may place the power play puck 216 on the power play area 214*a*. Placing the power play puck 216 in a power play area indicates that the power play wager is active. The power play puck 216 may remain in the respective power play area until the player wins or loses the power play wager. For the cases in which power play wagers are placed by multiple players, the dealer may place a power play puck 216 per power play wager in a corresponding power play area. For example, player 1 may place a power play wager in power play area 214*a*, and player 2 may place a power play wager in power play area 214*b*, in which case, the dealer may place a power play puck in power play area 214*a* and another power play puck in power play area 214*b*. In one or more cases, the positioned power play puck may correspond to the individual power play wager placed in the power play area. In one or more other cases in which multiple power play wagers are placed in the same power play area, the dealer may place one power play puck in the power play area to indicate that one or more power play wagers are active. In one or more other cases in which multiple power play wagers are placed in the same power play area, the dealer may place a power play puck per power play wager to indicate the player that placed the power play wager. For example, player 1 sitting in a first seat at the craps table 106 and player 2 sitting in a second seat at the craps table 106 may each place a power play wager in power play area 214*a*. The dealer may place a first power play puck in the power play area 214*a* to indicate player 1's power play wager, and a second power play puck in the power play area 214*a* to indicate player 2's power play wager. In one or more cases, the craps table 106 may optionally include one or more player position indicators, similar to the player position indicators 302*a*, 302*b*, 302*c*, 302*d*, 302*e*, and 302*f* of the roulette table 108, to indicate a player in the craps game, e.g. player 1 may be seated at the craps table in player position 1.

In one or more cases in which it is determined that the result of the roll on the come-out phase is a third predetermined number, the shooter may select a number for a subsequent roll of the dice (232). For example, before the shooter throws the pair of dice, the shooter may select a number, e.g., 7, and indicate to the dealer that the winning number for the roll is a 7. In one or more other cases, the winning number for the result of the shooter's next throw may be predetermined by the casino. For example, the casino may indicate that the winning number on a subsequent roll of the dice for a power play wager may be a 7. In one or more cases, before the shooter throws the pair of dice again, the shooter and/or one or more other players may place traditional craps wagers on the craps table 106. After the one or more wagers are placed, the shooter may throw the pair of dice again. The dealer determines a result for the subsequent roll of the dice. A determination (234) is made as to whether the result of the subsequent rolled dice is the selected number. For instance, the dealer determines whether the result of the subsequent roll is a 7.

For the cases in which the result of the subsequent rolled dice is the selected number (234: YES), the dealer pays M to 1 on the wager (236). For example, if the selected number is 7, and the shooter subsequently rolled the dice resulting in a total of 7, the dealer pays the player 3 to 1 on the power play wager. It should be noted that the odds payout of 3 to 1 is merely exemplary and other odds payouts may be used, e.g., paying 4 to 1 on rolling the selected number. For the cases in which the result of the subsequent rolled dice is not the selected number (238: NO), the dealer collects the wager (238). For example, if the selected number is a 7, and the shooter subsequently rolled the dice resulting in a total of 6, the player loses the power play wager, and the dealer collects the wager. In one or more cases, the dealer removes the power play puck 216 from the power play area (240). The dealer may remove the power play puck 216 after determining whether the result of the subsequent rolled dice is the selected number.

Figure 3A:
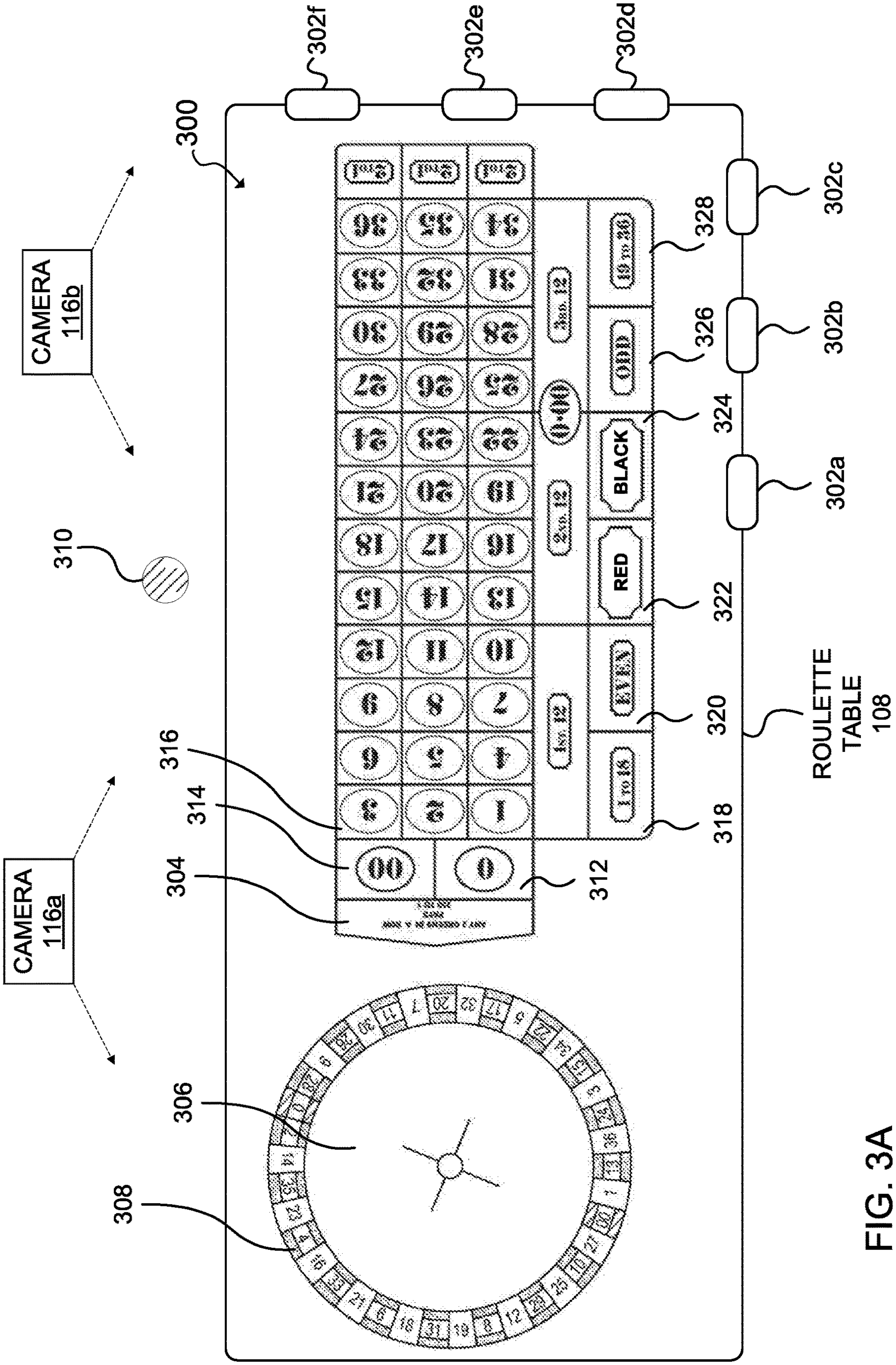
FIG. 3A is another example gaming table within the casino.
Figure 3B:
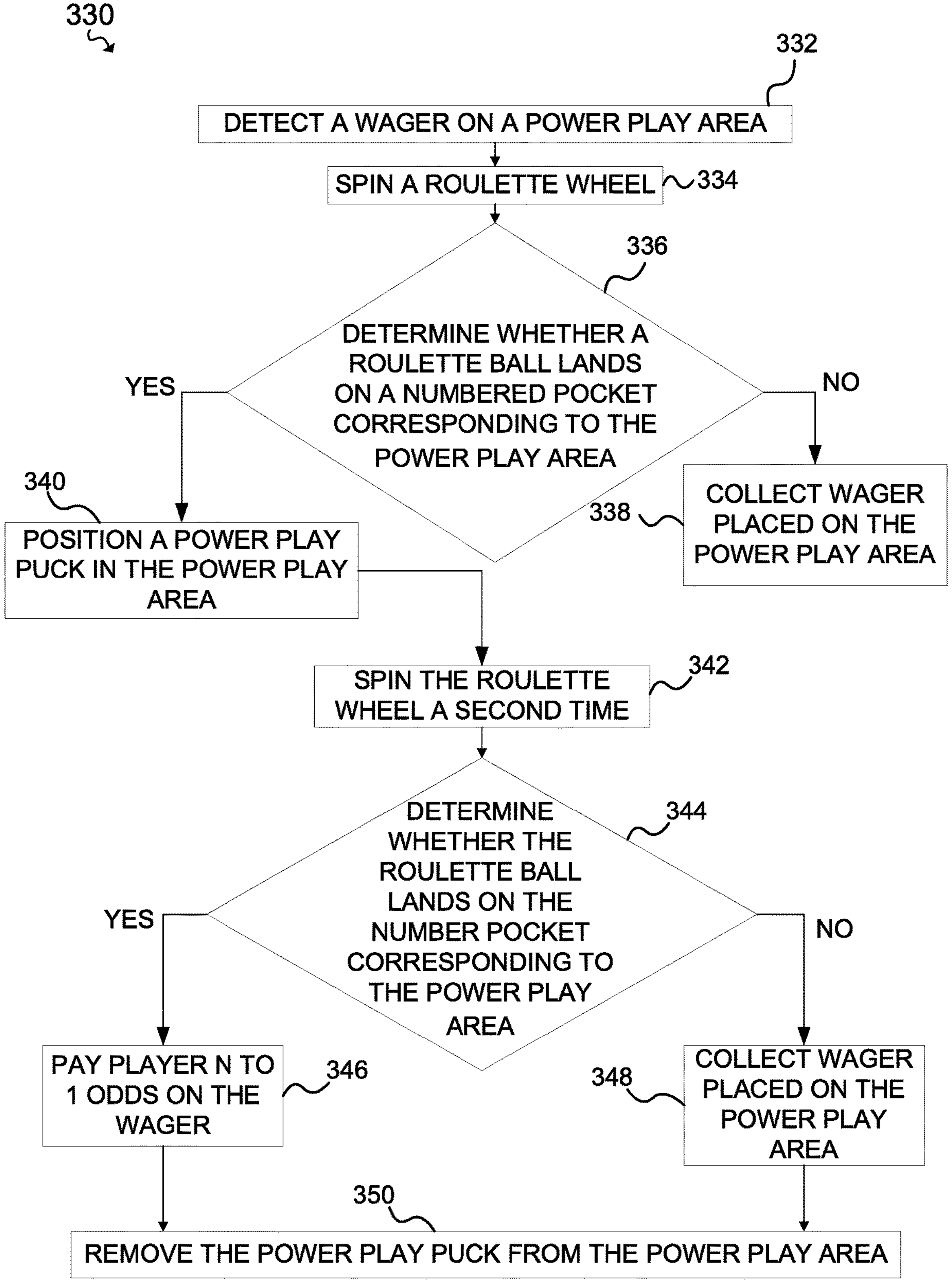
FIG. 3B is a flowchart that illustrates a method of operating the gaming table of FIG. 3A.

FIG. 3A is another example gaming table, such as a roulette table 108, within the casino 100. FIG. 3B is a flowchart that illustrates a method, generally designated 330, of operating the gaming table 108 of FIG. 3A.

The roulette table 108 may be an elongated gaming table having a horizontal surface that includes a game play area 300 and a roulette wheel 306 for playing roulette, and more particularly for playing a game of roulette that involves power play wagering. The game play area 300 includes marked areas that correspond to various types of wagers, for example, an individual number wagering area 316 (e.g. "3"), an even number wagering area 320, a red number wagering area 322, a black number wagering area 324, an odd number wagering area 326, "0" wagering area 312, "00" wagering area 314, a power play area 304, and other multiple number wagering areas, such as area 318 and area 328, which indicate a wager on multiple numbers (e.g. "1-18" and "19-36" respectively). The marked areas correspond to a numbered pocket on the roulette wheel 306. The marked areas may be formed in a variety of shapes, for example, a square or rectangular shape, and may include text within the perimeter of the marked area to indicate the type of wager. The marked areas may be printed on the horizontal surface of the roulette table 108.

The roulette wheel 306 includes a plurality of numbered pockets, such as pocket 308. The pockets may be circumferentially disposed around the periphery of the roulette wheel 306. Each numbered pocket may be associated with a color, such as red or black, in which the color creates a background for each number of the numbered pockets. For example, the numbers of the red colored pockets may be 1, 3, 5, 7, 9, 12, 14, 16, 18, 19, 21, 23, 25, 27, 30, 32, 34, and 36. The numbers of the black colored pockets may be, for example, 2, 4, 6, 8, 10, 11, 13, 15, 17, 20, 22, 24, 26, 28, 29, 31, 33, and 35. The roulette wheel 306 may include a "0" numbered pocket and/or a "00" numbered pocket, which are associated with another color, such as green.

The housing of the roulette wheel 306 is configured to spin or rotate about a vertical axis. A dealer operating the roulette table 108 may introduce a ball into the spinning housing of the roulette wheel 306 tangentially to the periphery of the roulette wheel 306 and in a direction opposite to the rotation of the roulette wheel 306. The ball may travel around the periphery of the housing multiple times before falling toward the center of the roulette wheel 306. The ball may come to rest in one of the numbered pockets of the roulette wheel 306. The roulette wheel 306 may include a number of obstacles on the outer periphery to prevent a simple, harmonious fall of the ball into a pocket. An obstacle may be, for example, an elongated and rigid piece of material protruding from the surface of the housing.

In one or more cases, the roulette table 108 optionally includes one or more player positions indicators, such as player position indicators 302*a*, 302*b*, 302*c*, 302*d*, 302*e*, and 302*f*. The player position indicators may be disposed around an outer perimeter of the roulette table 108, and indicate where players can sit or stand and place bets on the table using chips, markers, and/or cash (hereinafter chips, markers, and/or cash are referred to as "chips"). Although FIG. 3A shows six player positions, embodiments are contemplated in which there may be fewer than six player position indicators or greater than six player position indicators. The dealer may stand at a position near the roulette wheel 306.

In roulette, a player may place a bet on which numbered pocket of the roulette wheel 306 the player thinks the ball will ultimately come to rest. The player may place chips on the one or more marked areas of the game play area 300 to indicate the player's wager on the outcome of the spin. For example, a player may place a wager on a single pocket number by placing a chip on a corresponding individual number wagering area 316. If the ball lands in the single pocket number, the player wins the wager. The payout of the wager depends on the odds of winning the wager, which is, for example, 35:1 for a "straight up" wager on a particular numbered pocket of the roulette wheel 306.

The player may place other number combination wagers. For example, a "split" is a wager that the ball will fall into one of two numbered pockets with 17:1 odds. A "corner" is a wager that the ball will fall into one of four numbered pockets with 8:1 odds. A "street" is a wager that the ball will fall into one of three numbered pockets with 11:1 odds. A "six line" is a wager that the ball will fall into one of six numbered pockets with 5:1 odds. A variety of other bets with smaller payouts may be made as well, including whether the ball will land in a "odd" or "even" pocket, a "small" pocket (one of pockets 1-18), a "big" pocket (one of pockets 19-36), a black pocket or red pocket for which the payout is 1:1, and a "dozen" wager and a "column" wager for which the payout is 2:1.

In one or more cases, a wager is detected on the power play area 304 (332). For example, the dealer at the roulette table 108 may detect the one or more players placed a wager on the power play area 304 of the game play area 300. The winning numbers of the power play area 304 may include the "0" numbered pocket and/or the "00" numbered pocket on the roulette wheel 306. By placing a wager on the power play area 304, the player initiated a power play wager. In such cases, the power play area 304 is predetermined and a constant defined area for all rounds played at the roulette table 108. The payout for winning a wager placed on the power play area 304, as described herein, may be 350 to 1. In one or more other cases, the power play area may include one or more other marked areas on the game play area 300, in which the power play area is predetermined and a constant defined area for all rounds played at the roulette table 108. For example, the power play area may include a set of individual number wagering areas 316, such as the wagering areas corresponding to the "3" numbered pocket and the "6" numbered pocket. In yet one or more other cases, the power play area power play area may include one or more marked areas on the game play area 300, in which the power play area is predetermined yet is randomly generated for each round. For example, in one round of roulette, the power play area may be the "0" wagering area 312 and the "00" wagering area 314, and in a subsequent round of roulette, the power play area may be multiple number wagering area 318. In such cases, the payout odds may vary according to the defined power play area. For example, winning a power play wager in which the power play area is the power play area 304, the payout may be 350 to 1, whereas winning a power play wager in which the power play area is the "0" wagering area 312 and the "00" wagering area 314, the payout may be 35 to 1, and whereas winning a power play wager in which the power play area is the multiple number wagering area 318, the payout may be 2 to 1. For the cases in which the power play area is randomly generated for each round, the designated power play area may be indicated on a display screen that corresponds to the roulette table 108. In one or more cases, the program 110 may randomly generate the power play area and transmit the power play area to the display screen, which displays the power play area for the spin of the roulette wheel 306.

The player may place the power play wager on the power play area at the beginning of each round and/or before the dealer places the ball on the roulette wheel 306. It should be noted that one or more players may place other traditional roulette wagers in addition to the power play wager. In one or more cases, having received the one or more power play wagers, the dealer may optionally place the power play puck 310 in the power play area to indicate that a power play wager is active. Having received the wager, the croupier spins the roulette wheel 306 (334). The dealer places a roulette ball on the housing of the spinning roulette wheel 306.

A determination is made (336) as to whether the roulette ball lands on a numbered pocket corresponding to the power play area. For the cases in which the roulette ball lands on a numbered pocket that does not correspond to the power play area (336: NO), the dealer collects the wager placed on the power play area (338). For example, the power play area 304 may include the "0" numbered pocket and/or the "00" numbered pocket on the roulette wheel 306; however, the ball landed in the number 4 pocket, in which case the player loses his or her wager. For the cases in which the roulette ball lands on a numbered pocket that does correspond to the power play area (336: YES), the dealer positions a power play puck 310 in a power play area (340). For example, the dealer determines that the roulette ball lands on the 0 numbered pocket. Placing the power play puck 310 in the power play area may indicate that the power play wager is still active and no additional bets may be placed in the power play area. In one or more cases, the player may place wagers on one or more other marked areas of the game play area 300.

Having received any additional wagers, the dealer spins the roulette wheel 306 a second time (342). The dealer places a roulette ball on the housing of the spinning roulette wheel 306. A determination is made (344) as to whether the roulette ball lands on the numbered pocket corresponding to the power play area. For the cases in which the roulette ball lands on a numbered pocket that does not correspond to the power play area (344: NO), the dealer collects the wager placed on the power play area (348). For example, the power play area 304 may include the "0" numbered pocket and/or the "00" numbered pocket; however, the ball landed in the number 10 pocket, in which case the player loses his or her wager. For the cases in which the roulette ball lands on a numbered pocket that does correspond to the power play area (336: YES), the dealer pays the player N to 1 odds on the wager (346). For example, the dealer determines that the roulette ball lands on the "00" numbered pocket, in which case the dealer pays the player 350 to 1 odds on the wager. In one or more cases, the dealer removes the power play puck 310 from the power play area (350). The dealer may remove the power play puck 310 after determining the result of the subsequent spin of the roulette wheel.

Although the embodiments discussed and illustrated with respect to FIGS. 2A, 2B, focus on, physical gaming tables, such as craps table 106 and roulette table 108, the embodiments are not so limited. For example, the embodiments, in particular with respect to the method 218 and the method 330, may be implemented "virtually" as a game on an electronic computing device, such as a video gaming terminal, a mobile application on a smart phone, or on a personal computer, in which a user may interact virtually with the power play wagering game, via method 218 or method 330. For example, with respect to the virtual roulette table 108 displayed by images on the user's electronic computing device, the user may place a wager on the power play area, and the computer spins a virtual roulette wheel, which is represented by images displayed on the electronic computing device. The game may operate on a dedicated electronic computing device located, for example, on the floor of a casino. In one or more other cases, the game may be stored on the server 104, and may be accessed remotely by the electronic computing device, via an Internet-based casinos.

Figure 4:
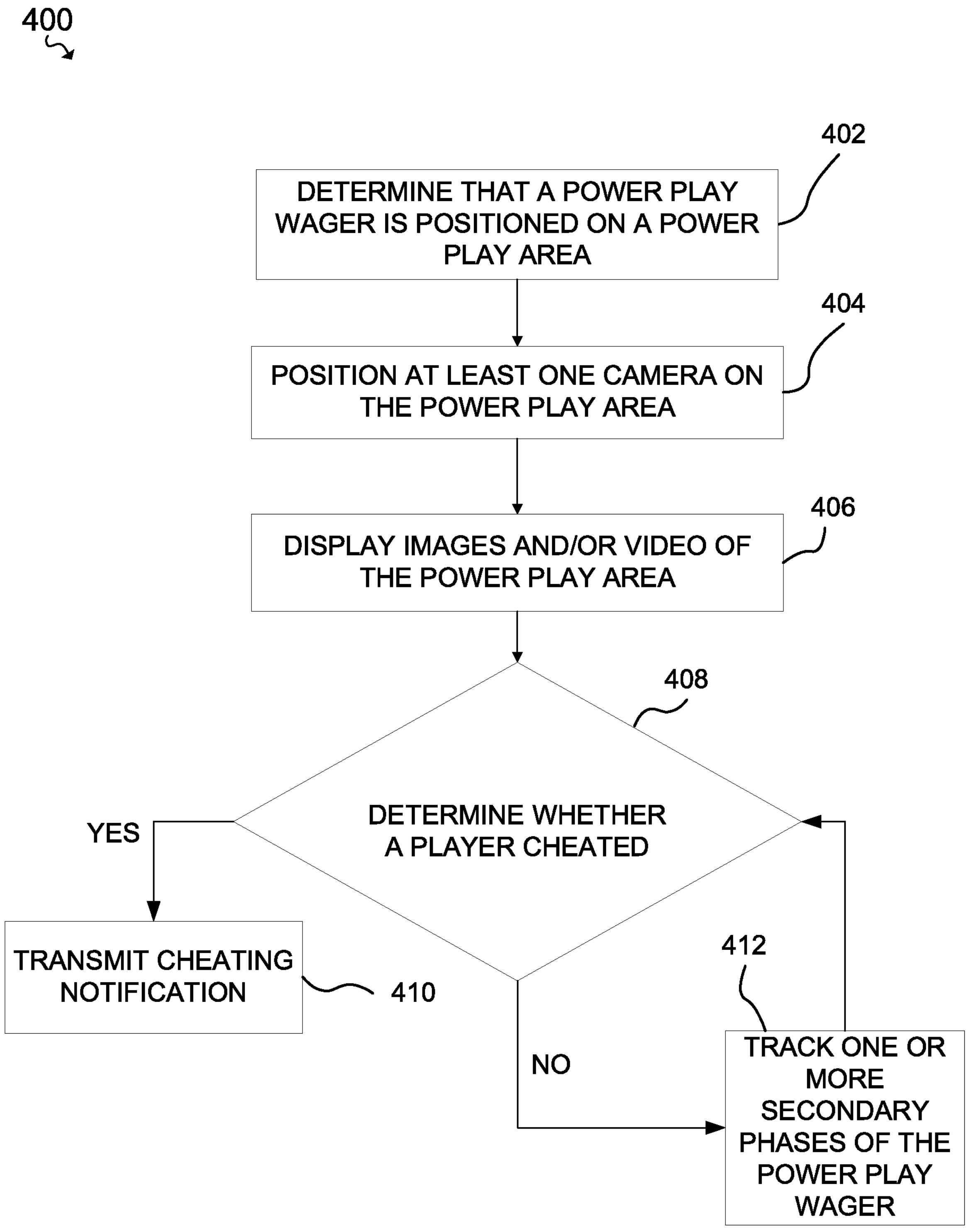
FIG. 4 is a flowchart that illustrates monitoring the gaming tables of FIG. 2A and/or FIG. 3A.

FIG. 4 is a flowchart that illustrates a method, generally designated 400, of monitoring the gaming table 106 of FIG. 2A or the gaming table 108 of FIG. 3A.

In one or more cases, the program 110 may monitor the gaming table and one or more phases of the power play wager to detect a player cheating at a gaming table, such as gaming table 106 and/or gaming table 108. At an initial phase of playing a round at the gaming table, e.g., the craps table 106, the one or more cameras focused on the gaming table may be configured to capture images and/or video of the entire gaming table. Alternatively, one or more cameras may be positioned on a particular area of the gaming table, and one or more other cameras may be positioned on either another area of the gaming table or the entire gaming table.

In one or more cases, the program 110 determines that a power play wager is positioned on the power play area (402).

In one or more cases, the program 110 determines that the power play wager is positioned on the power play area by analyzing image data captured from the one or more cameras 114. The one or more cameras 114 may be positioned to capture one or more images and/or video of the craps table 106. The one or more cameras 114 may be positioned on the ceiling above the respective tables. For example, camera 114*a* and camera 114*b* may be positioned on the ceiling above the craps table 106. It should be understood that in one or more cases, the craps table 106 may include less than two cameras, and that in one or more other cases, the craps table 106 may include more than two cameras. In one or more cases, the cameras 114*a* and 114*b* may be positioned such that each camera is configured to capture images and/or video of the entire craps table 106. The cameras 114*a* and 114*b* may each be configured to capture images and/or video of a portion of the craps table 106. For example, camera 114*a* may capture a video of the power play area 214*a*, and camera 114*b* may capture a video of the game play area 200. The cameras are configured to transmit, via the network 102, the data related to the captured images and/or video to the one or more security devices 124. The one or more security devices 124 may be configured to receive the data and display the images and/or video on the display of the one or more security devices 124. The cameras may capture and transmit the data and the security devices 124 may display the related images and/or video in real-time.

In one or more cases, the program 110 determines that a wager is positioned on the power play area by analyzing image data captured from the one or more cameras 116. The one or more cameras 116 may be positioned to capture one or more images and/or video of the roulette table 108. The one or more cameras 116 may be positioned on the ceiling above the respective tables. For example, camera 116*a* and camera 116*b* may be positioned on the ceiling above the roulette table 108. It should be understood that in one or more cases, the roulette table 108 may include less than two cameras, and that in one or more other cases, the roulette table 108 may include more than two cameras. In one or more cases, the cameras 116*a* and 116*b* may be positioned such that each camera is configured to capture images and/or video of the entire roulette table 108. The cameras 116*a* and 116*b* may each be configured to capture images and/or video of a portion of the roulette table 108. For example, camera 116*a* may capture a video of the power play area 304, and camera 116*b* may capture a video of the game play area 300. The cameras are configured to transmit, via the network 102, the data related to the captured images and/or video to the one or more security devices 124. The one or more security devices 124 may be configured to receive the data and display the images and/or video on the display of the one or more security devices 124. The cameras may capture and transmit the data and the security devices 124 may display the related images and/or video in real-time.

In one or more cases, the cameras 114 and 116 are configured to transmit, via the network 102, the data related to the captured images and/or video to the program 110. The program 110, using one or more image processing methods, may analyze the data to determine when a power play wager is positioned on a power play area of a respective gaming table. For example, for the cases in which a power play wager is positioned on a power play area, such as power play area 304, the program 110 determines that the received data includes one or more features of the power play wager. The one or more features of the power play wager may include a shape of the chip or marker, a color of the chip or marker, a number of chips or markers positioned on the power play area, or the like.

In one or more cases, the program 110 determines that the power play wager is positioned on the power play area by analyzing the weight of objects, such as the chips, positioned on the surface of the power play area. For example, the craps table 106 may include one or more weight sensors positioned beneath the surface of each of the power play areas on the craps table 106. In another example, the roulette table 108 may include one or more weight sensors positioned beneath the surface of each of the power play areas on the roulette table 108. In one or more cases, the weight sensors may activate and collect weight measurements according to the active power play area. For example, the weight sensor beneath the power play area 304 may collect weight measurements. The weight sensor may monitor the weight of one or more objects that are positioned on the surface of the respective power play area. The weight sensor may be connected to the server 104 and program 110 via the network 102. The weight sensor may collect the weights of the objects placed on the power play area, and transmit the weights to the program 110. For the cases in which the program 110 determines that the weight increases from 0 to another weight, the program 110 determines that a wager is positioned on the power play area. For other cases in which the program 110 determines that the weight increases by a weight of the power play puck, the program 110 determines that the power play puck is positioned on the power play area.

In one or more cases, the program 110 determines that a power play wager and/or a power play puck is positioned on the power play area based on a signal transmitted by the dealer at the gaming table or a casino security officer monitoring video, displayed on the security device 124, of the gaming table. For example, after a player and/or dealer places the player's power play wager on the power play area 304, the dealer may press a button that sends a signal to the program 110 to indicate that the power play wager is positioned on the power play area 304. In another example, a casino security officer monitoring video of the roulette table 108 may press a button that sends a signal to the program 110 to indicate that the power play wager is positioned on the power play area 304.

Having determined that the power play puck and/or a wager is positioned on a power play area of the gaming table, at least one camera is positioned on the power play area (404). In one or more cases, the program 110 sends a control signal to at least one camera to position the camera on the power play area. The control signal may be a signal to rotate a camera such that the camera is positioned to capture images and/or video of only the power play area.

With respect to the craps game, the control signal may be a signal to have the camera zoom in on the power play area for the cases in which the camera is positioned to capture images and/or video of the entire craps table 106. In one or more cases, the program 110 may be configured to send a control signal to one camera, such as camera 114*a*, to capture images and/or video of the entire craps table 106, and send another control signal to another camera, such as camera 114*b*, to capture images and/or video of the power play area. In one or more cases, the casino 100 may include one camera per power play area. In one or more other cases in which the craps table 106 utilizes only one camera, the program 110 may send a control signal to a camera to capture the entire craps table 106. The program 110 may receive the data related to the captured images and/or video, and, using one or more image processing methods, may analyze the data of the one or more power play areas to determine when a power play wager and/or a power play puck is positioned on one or more of the power play areas.

With respect to the roulette game, the control signal may be a signal to have the camera zoom in on the power play area for the cases in which the camera is positioned to capture images and/or video of the entire roulette table 108. In one or more cases, the program 110 may be configured to send a control signal to one camera, such as camera 116*a*, to capture images and/or video of the entire roulette table 108, and send another control signal to another camera, such as camera 116*b*, to capture images and/or video of the power play area, such as power play area 304. In one or more cases, the casino 100 may include one camera per power play area. In one or more other cases in which the roulette table 108 utilizes only one camera, the program 110 may send a control signal to a camera to capture the entire roulette table 108. The program 110 may receive the data related to the captured images and/or video, and, using one or more image processing methods, may analyze the data of the one or more power play areas to determine when the power play puck 310 is positioned on one or more of the power play areas.

Having determined that one or more power play wagers are positioned on a power play area of a respective gaming table, the program 110 analyzes information of the one or more power play wagers. For instance, the program 110 analyzes a power play wager, using an image processing technique, to determine the position of the power play wager on the power play area, the amount of the power play wager that was placed, or the like. The program 110 may determine the position of the power play wager on the power play area to distinguish the power play wagers placed on the power play area by other players. To determine the amount of the power play wager, the program 110 may determine the number of chips and the value of each chip based on their respective colors. The program 110 may store the number of chips and the value of each chip in the data storage repository 112, and may retrieve this information to compare the amount of the power play wager during one or more phases of the power play wagering game. The dealer may gesture that no more bets may be placed on the gaming table, i.e., an initial phase of the power play wagering game, in which the program 110 determines that the amount of the power play wager on the power play area is the total amount of the wager for the power play wager. The program 110 may compare the total amount of the power play wager at the initial phase to one or more secondary phases of the power play wagering game as discussed herein.

In one or more cases, the program 110 displays the images and/or video of the power play area (406). The program 110 displays the images and/or video of the power play area on one or more security devices 124. In some cases, the program 110 may send a signal to automatically display the power play area on the one or more security devices 124. In some other cases, the program 110 may send a signal that displays a query on the display of the one or more security devices 124. The query may present the user with an option of viewing the power play area on the display of the security device 124. For the cases in which the user selects the option of viewing the power play area, for example, by selecting an affirmative icon on the display, the program 110 sends a signal to the security device to display the power play area.

In one or more cases, the program 110 determines whether a player cheated (408). To determine whether a player cheated, the program 110 may analyze the power play wager positioned on a power play area during and/or after a secondary phase of the power play wagering game. The program 110 may analyze the power play wager to determine the amount of the power play wager during and/or after the secondary phase. To determine the amount of a power play wager, the program 110 may use an image processing technique on the power play wager to determine the number of chips and the value of each chip based on their respective colors. The program 110 may compute the amount of the power play wager based on the determined number of chips and the value of each chip. To determine whether a player cheated, the program 110 may compare the amount of the power play wager determined during and/or after the secondary phase to the amount of the power play wager determined at the initial phase of the power play wagering game.

The program 110 detects when the secondary phase occurs during the power play wagering game by determining when one or more events that correspond to the secondary phase occur. For example, with respect to a power play wager placed at the caps table 106, the program 110 may detect a secondary phase being a come-out roll by determining a pair of dice were rolled after the wagers were placed. In one or more cases, the program 110 determines when one or more events that correspond to the secondary phase occur by analyzing image data captured from the one or more cameras as discussed herein. In one or more other cases, the program 110 determines when one or more events that correspond to the secondary phase occur by receiving a signal transmitted by the dealer at the gaming table or a casino security officer monitoring video, displayed on the security device 124, of the gaming table. For example, after a pair of dice are rolled on the come-out roll, the dealer may press a button that sends a signal to the program 110 to indicate that the secondary phase that relates to the come-out roll occurred. Having detected a secondary phase of the power play wagering game, the program 110 compares the amount of the power play wager determined during and/or after the secondary phase to the amount of the power play wager determined at the initial phase of the power play wagering game.

With respect to a power play wager placed at the craps table 106, a secondary phase may include (i) detecting a roll of a pair of dice on a come-out roll; (ii) detecting a power play puck 216 positioned on a power play area; (iii) detecting a subsequent roll of the dice for the cases in which the power play puck 216 is positioned on the power play area of the craps table 106; and/or (iv) detecting the power play puck 216 being removed from the power play area, which indicates to the program 110 that the power play wager for the instant craps game is complete and the next secondary phase to detect is a roll of the dice on a subsequent come-out roll. At one or more of the secondary phases that occur at the craps table 106, the program 110 may analyze one or more power play wagers placed on the power play area to determine whether a player cheated as described herein.

With respect to a power play wager placed at the roulette table 108, a secondary phase may include (i) detecting a spin of the roulette wheel 306; (ii) detecting a power play puck 310 positioned on a power play area of the roulette table 108; (iii) detecting a second spin of the roulette wheel 306 for the cases in which the power play puck 310 is positioned on the power play area of the roulette table 108; and/or (iv) detecting the power play puck 310 being removed from the power play area, which indicates to the program 110 that the power play wager for the instant roulette game is complete and the next secondary phase to detect is a spin of the roulette wheel 306. At one or more of the secondary phases that occur at the roulette table 108, the program 110 may analyze one or more power play wagers placed on the power play area to determine whether a player cheated as described herein.

For the cases in which the program 110 determined that the player cheated (408: YES), the program 110 transmits a cheating notification (410). For example, the program 110 determines that the player cheated when the program 110 determines that the amount of the power play wager detected at a secondary phase is greater than or less than the amount of the power play wager detected at the initial phase of the game. In one or more cases, the program 110 may transmit the cheating notification to a display device at the gaming table, such that the dealer may see the notification on the display device, and/or to the security devices 124, such that security officers may respond to the cheating notification appropriately.

For the cases in which the program 110 does not determine that the player cheated (408: NO), the program 110 tracks one or more secondary phases of the power play wager (412). For instance, with respect to a power play wager placed on the craps table 106, if the program 110 does not detect cheating during the secondary phase of (i) detecting a roll of the dice on a come-out roll, the program 110 determines that the next secondary phase to determine cheating is (ii) detecting a power play puck 216 positioned on a power play area. Having detected a next phase of the power play wager, the program 110 determines whether a player cheated (408). This process may repeat until the player wins or loses the power play wager.

Figure 5:
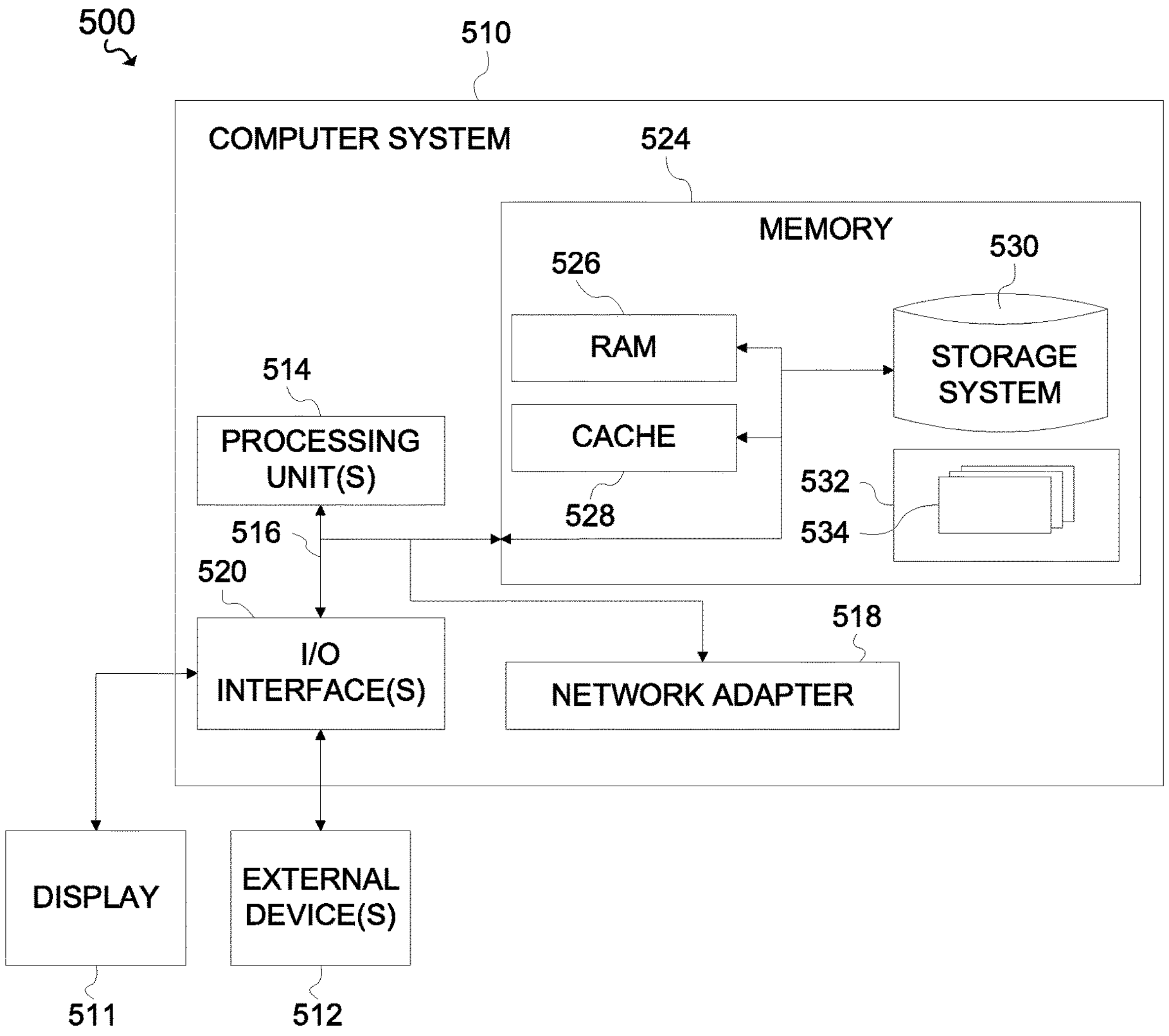
FIG. 5 is a block diagram depicting components (such as the server of FIG. 1) of the casino.

FIG. 5 is a block diagram depicting components (such as the server 104 of FIG. 1) of a data processing system. FIG. 5 is a block diagram, generally designated 500, depicting components of computing device capable of operating the authentication program 110 in accordance with embodiments of the present disclosure. FIG. 5 provides only an illustration of one implementation and does not imply any limitations with regard to the environments in that different embodiments may be implemented. Many modifications to the depicted environment may be made.

In one or more cases, the server 104 in the data processing environment 100 is shown in the form of a general-purpose computing device, such as computer system 510. The components of the computer system 510 may include, but are not limited to, one or more processors or processing unit 514, a memory 524, and a bus 516 that couples various system components including the memory 524 to the processing unit 514.

The bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system 510 typically includes a variety of computer system readable media. Such media may be any available media that is accessible by the computer system 510, and it includes both volatile and non-volatile media, removable and non-removable media.

The memory 524 can include computer system readable media in the form of volatile memory, such as random access memory (RAM) 526 and/or cache memory 528. The computer system 510 may further include other removable/non-removable, volatile/non-volatile computer system storage media. By way of example only, the storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to the bus 516 by one or more data media interfaces. As will be further depicted and described below, the memory 524 may include at least one computer program product having a set (e.g., at least one) of program modules that are configured to carry out the functions of embodiments.

A program/utility 532, having one or more sets of program modules 534, may be stored in the memory 524 by way of example, and not limitation, as well as an operating system, one or more application programs, other program modules, and program data. Each of the operating systems, one or more application programs, other program modules, and program data, or some combination thereof, may include an implementation of a networking environment. The program modules 534 generally carry out the functions and/or methodologies of embodiments as described herein. The computer system 510 may also communicate with one or more external device(s) 512 such as a keyboard, a pointing device, a display 511, etc., or one or more devices that enable a user to interact with the computer system 510 and any devices (e.g., network card, modem, etc.) that enable the computer system 510 to communicate with one or more other computing devices. Such communication can occur via Input/Output (I/O) interface(s) 520. Still yet, the computer system 510 can communicate with one or more networks such as a local area network (LAN), a general wide area network (WAN), and/or a public network (e.g., the Internet) via a network adapter 518. As depicted, the network adapter 518 communicates with the other components of the computer system 510 via the bus 516. It should be understood that although not shown, other hardware and software components, such as microcode, device drivers, redundant processing units, external disk drive arrays, RAID systems, tape drives, and data archival storage systems may be used in conjunction with the computer system 510.

The embodiments described in the present disclosure may relate to a system, a method, and/or a computer program product. The computer program product may include a computer readable storage medium (or media) having computer readable program instructions for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions, cloud storage, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a non-transitory computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the embodiments may be instruction-set-architecture (ISA) instructions, machine instructions, machine dependent instructions, microcode, firmware instructions, state-setting data, or either source code or object code written in any combination of one or more programming languages, including an object oriented programming language such as C++ and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more cases, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments described in the present disclosure.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by non-transitory computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may be executed substantially concurrently, the blocks may sometimes be executed in the reverse order, depending upon the functionality involved, or the blocks may sometimes be executed out of order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

The various embodiments described above are provided by way of illustration only and should not be construed to limit the claims attached hereto. It will be appreciated that one or more embodiments of the above-disclosed and other features and functions, or alternatives thereof, may be desirably combined into many other different systems or applications.

What is claimed is:

1. A game system comprising:

a surface forming a game play area, the game play area comprising a plurality of wagering areas, the plurality of wagering areas including a power play area;

one or more weight sensors positioned beneath the power play area;

one or more cameras; and one or more processors in communication with the one or more weight sensors and the one or more cameras, the one or more processors configured to:

collect, by the one or more weight sensors, weight measurements associated with the power play area, the weight measurements representative of one or more objects positioned on the surface of the power play area;

analyze the collected weight measurements to determine a weight of objects positioned on the surface of the power play area;

receive weight measurements from the one or more weight sensors, the weight measurements representative of one or more objects positioned on the surface of the power play area;

monitor the weight measurements to determine an increase indicating a wager positioned on the power play area;

in response to detecting the wager positioned on the power play area, send a control signal to at least one of the one or more cameras, positioning the at least one camera to capture images of the power play area;

receive image data from the at least one camera;

analyze the received image data to determine that a wager is positioned on the power play area by detecting, within image data of the power play area, one or more chips positioned on the power play area, wherein detecting the one or more chips comprises detecting a chip shape, a chip color, and/or a number of chips;

further analyze the received data to determine an initial value of the wager based on the detected one or more chips positioned on the power play area;

further analyze the received image data to determine a secondary phase of the wagering game by detecting one or more events subsequent to detecting the wager positioned on the power play area, the one or more events corresponding to the secondary phase, by detecting a roll of a plurality of dice;

in response to detecting the one or more events corresponding to the secondary phase, further analyze received image data to determine a value of the wager at the secondary phase of the wagering game;

determine whether a player cheated by comparing the initial value of the wager to the value of the wager determined at the secondary phase; and in response to determining that the player cheated, transmit a cheating notification to a display device of the wagering game, causing the display device to display the notification.

2. The game system of claim 1, wherein the one or more processors are further configured to, in response to detecting the wager positioned on the power play area, send a control signal to at least one of the one or more cameras, causing the at least one camera to zoom in on the power play area.

3. The game system of claim 1, wherein the one or more processors are further configured to, in response to detecting the wager positioned on the power play area:

analyze the received image data to determine that a plurality of wagers are positioned on the power play area of the game play area; and analyze image data of the one or more images of the wager on the power play area to determine an initial value of each of the plurality of wagers based on the detected chips.

4. The game system of claim 3, wherein the one or more processors are further configured to, in response to detecting the one or more events corresponding to the secondary phase:

analyze image data of the one or more images of the wager at the secondary phase of the wagering game to determine a value of each of the plurality of wagers at the secondary phase of the wagering game;

determine whether at least one player cheated by comparing the initial value of each of the plurality of wagers at the determined phase of the game to the value of each of the plurality of wagers determined at the secondary phase; and in response to determining that the at least one player cheated, transmit the cheating notification to a display device of the wagering game, causing the display device to display the notification.

* * * * *